United States Patent
Kairali et al.

(10) Patent No.: US 11,477,293 B2
(45) Date of Patent: Oct. 18, 2022

(54) OPTIMIZE MIGRATION OF CLOUD NATIVE APPLICATIONS IN A MUTLI-CLOUD ENVIRONMENT

(71) Applicant: International Business Machines Corporation, Armonk, NY (US)

(72) Inventors: Sudheesh S. Kairali, Kozhikode (IN); Abhinav Gupta, Patna (IN); Abhishek Seth, Deoband (IN); Shajeer K Mohammed, Bangalore (IN); Hariharan Krishna, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/179,571

(22) Filed: Feb. 19, 2021

(65) Prior Publication Data
US 2022/0272157 A1    Aug. 25, 2022

(51) Int. Cl.
| | | |
|---|---|---|
| G06F 15/16 | (2006.01) |
| H04L 67/148 | (2022.01) |
| H04L 67/1097 | (2022.01) |
| H04L 67/61 | (2022.01) |
| H04L 67/561 | (2022.01) |

(52) U.S. Cl.
CPC ........ H04L 67/148 (2013.01); H04L 67/1097 (2013.01); H04L 67/561 (2022.05); H04L 67/61 (2022.05)

(58) Field of Classification Search
CPC .............. H04L 67/148; H04L 67/1097; H04L 67/2804; H04L 67/322; H04L 67/61; H04L 67/561
USPC .................................................. 709/201–203
See application file for complete search history.

(56) References Cited

U.S. PATENT DOCUMENTS

| | | | |
|---|---|---|---|
| 2016/0359697 A1* | 12/2016 | Scheib ................ G06F 9/45558 |
| 2018/0107466 A1* | 4/2018 | Rihani .................. G06F 9/4856 |
| 2018/0191599 A1* | 7/2018 | Balasubramanian ........................ H04L 67/148 |
| 2018/0260241 A1* | 9/2018 | Khurange ........... G06F 11/1464 |
| 2019/0149617 A1* | 5/2019 | Gao ...................... H04L 67/148 709/223 |
| 2019/0288915 A1 | 9/2019 | Denyer et al. |
| 2020/0034167 A1* | 1/2020 | Parthasarathy ..... G06F 9/45558 |
| 2020/0050518 A1 | 2/2020 | Wang et al. |

(Continued)

OTHER PUBLICATIONS

Anonymous, IBM Introduces New Services to Automate Cloud Migration, New automation tools help simplify and accelerate migration to hybrid cloud, https://newsroom.ibm.com/2018-11-16-IBM-Introduces-New-Services-to-Automate-Cloud-Migration, Nov. 16, 2018, pp. 1-3.

*Primary Examiner* — Bharat Barot
(74) *Attorney, Agent, or Firm* — Alexander Jochym; Otterstedt & Kammer PLLC (57) ABSTRACT

A method for migrating an application includes representing the application as a vector including metadata about the application and at least one customer constraint, scoring a deviation of data consistency for the application related to each of a plurality of clouds, including a cloud in which the application is currently deployed and a plurality of potential target clouds, selecting one of the potential target clouds based on the scoring, wherein the selected cloud has an improved score over the cloud in which the application is current deployed, and migrating the application to the selected cloud.

20 Claims, 8 Drawing Sheets

(56) References Cited

U.S. PATENT DOCUMENTS

| | | |
|---|---|---|
| 2020/0104161 A1 | 4/2020 | Kapur et al. |
| 2020/0133738 A1 | 4/2020 | Junior |

* cited by examiner

OPTIMIZE MIGRATION OF CLOUD NATIVE APPLICATIONS IN A MUTLI-CLOUD ENVIRONMENT

BACKGROUND

The present disclosure relates generally to a computer processes, and more particularly to methods for migrating an application between different cloud environments.

Cloud native software applications and services are moving toward an environment of multi-cloud deployment. Moreover, legacy services are being replaced by micro-services.

The multi-cloud is a de facto heterogeneous environment. As apps and services are being deployed in such environments, the migration of apps and micro-services supporting the apps between different clouds or cloud providers is inevitable.

SUMMARY

According to some embodiments of the present invention, a method for migrating an application between computer environments comprises representing the application as a vector comprising application metadata and customer metadata describing technological requirements, wherein a customer is an owner of the application, representing n environments as n clusters, and the application deployed in one of the environments as a data point in a current one of the n clusters, wherein the data point is the vector, determining a first score of the application as a component of the current one of the n clusters, determining a second score of the application as a potential component of another one of the at least one of then clusters, wherein the first score and the second score are determined by a data consistency analysis, and migrating the application to an environment corresponding to the another one of the at least one of the n clusters upon determining that the second score indicates an improvement over the first score.

According to some embodiments of the present invention, a method for migration an application includes representing the application as a vector including metadata about the application and at least one customer constraint, scoring a deviation of data consistency for the application related to each of a plurality of clouds, including a cloud in which the application is currently deployed and a plurality of potential target clouds, selecting one of the potential target clouds based on the scoring, wherein the selected cloud has an improved score over the cloud in which the application is current deployed, and migrating the application to the selected cloud.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:

intelligent optimization of application migration between environments;

a metadata consistency check for multi-cloud application migration based on a (minimum) set of dimensions of the application and any customer constraints;

application migration to one or more target clusters (clouds) selected using data consistency deviation;

functionality enabling an override of one or more dimensions during the process of target cluster selection via data consistency check of metadata; and background data consistency checks used generate automated recommendations and/or selections of clusters (clouds).

These and other features and advantages of the present invention will become apparent from the following detailed description of illustrative embodiments thereof, which is to be read in connection with the accompanying drawings.

BRIEF DESCRIPTION OF THE DRAWINGS

Preferred embodiments of the present invention will be described below in more detail, with reference to the accompanying drawings.

DETAILED DESCRIPTION

According to some embodiments of the present invention, methods for migrating an application between different environments (e.g., cloud environments) advantageously consider whether other technologically similar applications have been migrated, the target environment for similar applications (e.g., application with similar billing or availability concerns), which environments provider is the best suited one for the needs of the application, and what automated recommendations are appropriate (e.g., determined by background data consistency checks).

For purposes of the present disclosure, technologically similar applications use similar or the same technology stack in their deployment architecture. For example, two cloud native applications deployed in a cloud platform can be called technologically similar if they use the same or similar dependencies and technologies from the platform; these two cloud native applications might both use NoSql/Cloudant databases, Redis in-memory data structure stores, and Kubernetes clusters with similar capacities and resources. One of ordinary skill in the art would understand similarity in the context of different applications.

According to some embodiments, a method of migrating an application to a new cloud environment includes performing a metadata consistency check based on a set of dimensions of the application and the customer (application developer).

According to some embodiments, the method uses a measure of data consistency deviation (a data consistency check) to select one or more target clusters. The method enables an override function one or more dimensions during the process of target cluster selection via data consistency check.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 1:
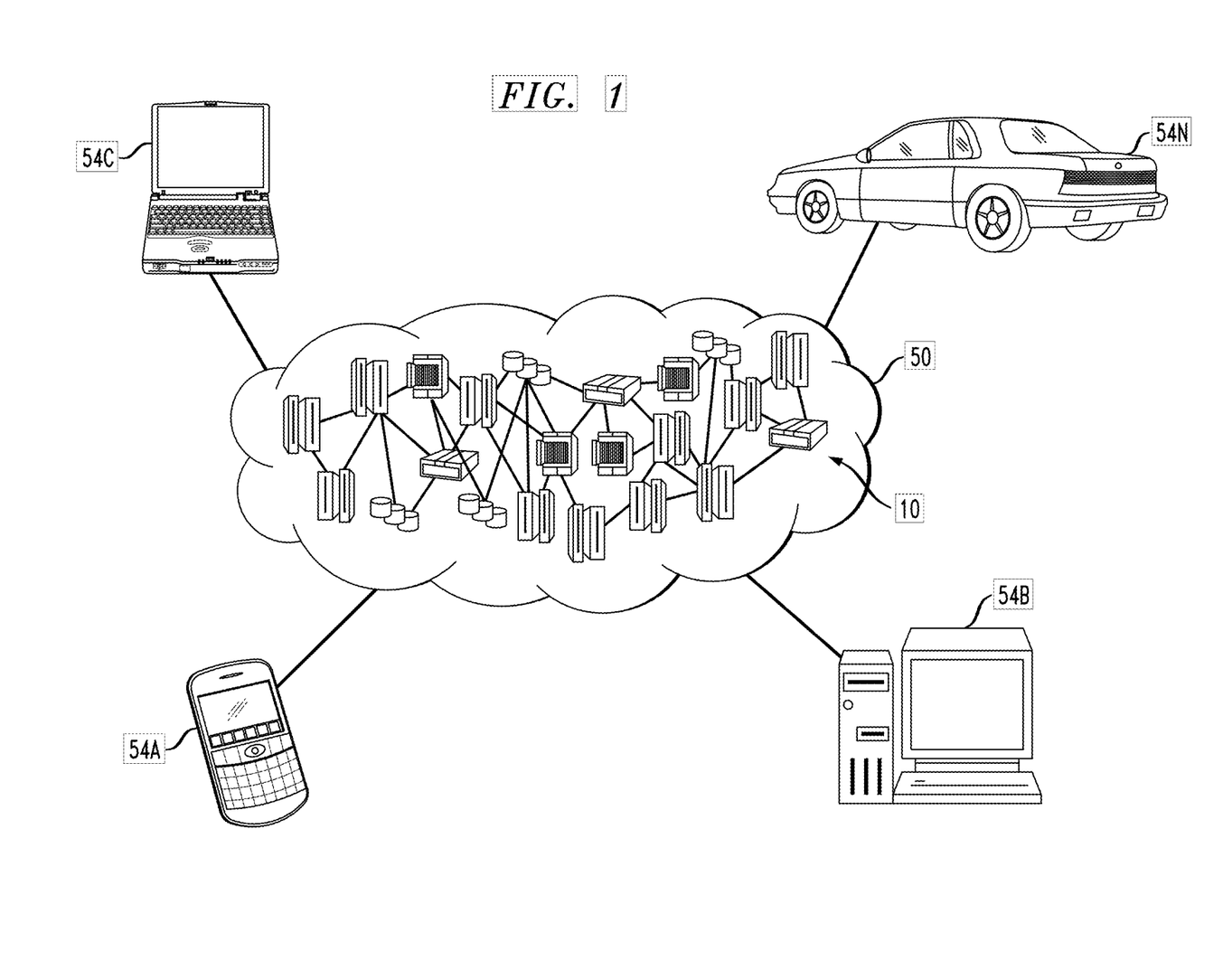
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
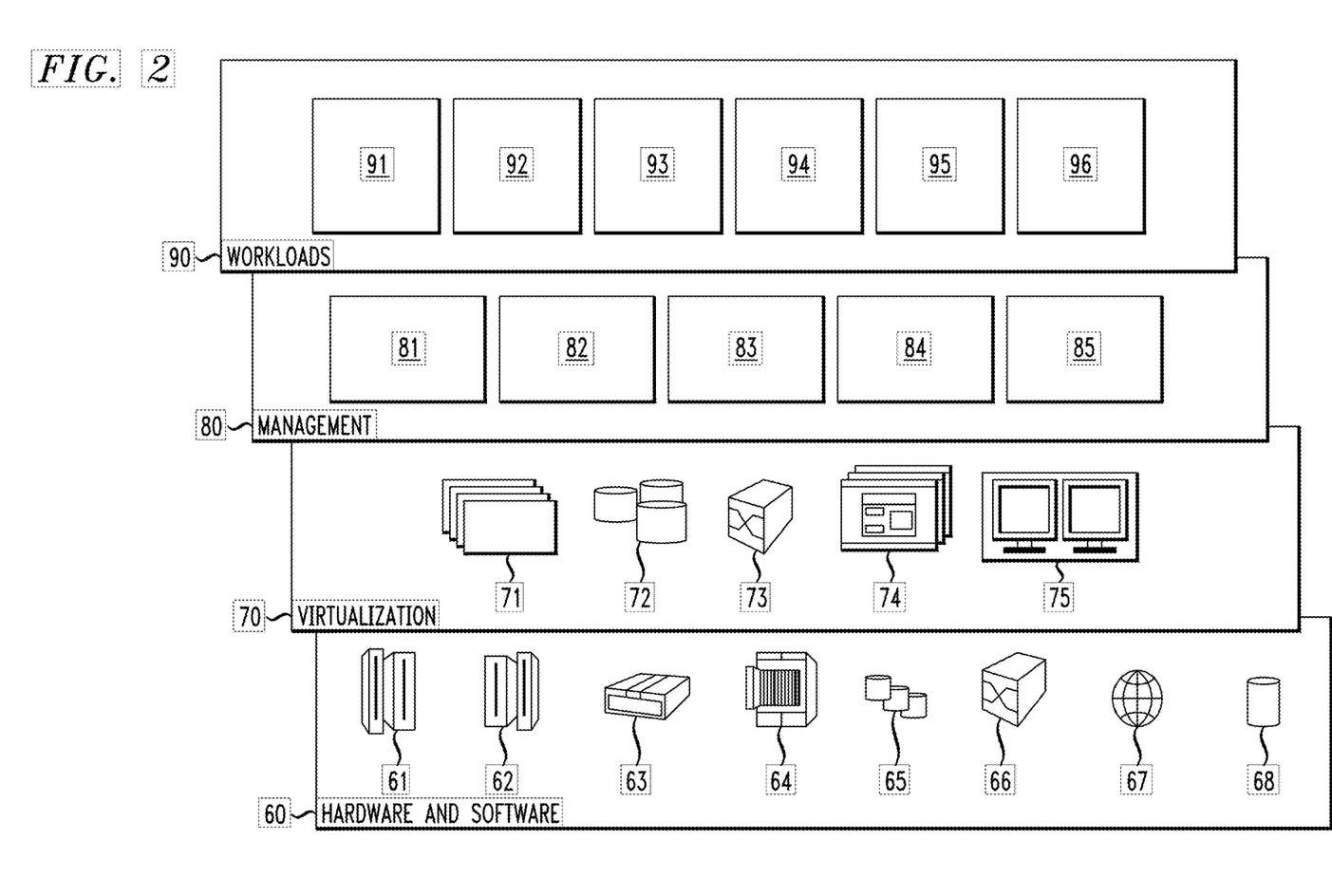
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and intelligent optimization of application migration between environments 96.

Every software application has its own technological requirements. Typically, the software application will also be associated with customer constraints on the application, e.g., billing, availability, etc. Embodiments of the present invention include methods for migrating the application from an on-premises environment to a cloud, or from one cloud to another, finds an appropriate cloud (or cloud provider) given the technological requirements and the customer constraints.

According to some embodiments of the present invention, a method for intelligent optimization of application migration between environments includes representing an application as a vector (i.e., metadata comprising dimensions) of its technological requirements and customer constraints (if any) (see for example, FIG. 5); weighting different dimensions of the vector representation of the application based on the customer preferences (e.g., a customer may have a preference for a certain technological parameter, and can give weight to the preference accordingly); representing an environment of n cloud providers as n clusters and the application as a data point (i.e., the vector representation of the application) associated with one or more of the clusters in which it is deployed; and considering two or more target clouds as migration targets of the application (the vector representation). According to some embodiments, the consideration of the potential target clouds includes performing a data consistency analysis (e.g., calculating a silhouette score) for the technological requirements and the customer constraints. According to one or more embodiments, the methods includes migrating the application to a target cloud having a best silhouette score. According to some embodiments, the customer preferences are contextual requirements that affect the determination of the silhouette scores.

While different data consistency analysis methods can be used to compare applications and clusters accordingly to embodiments of the present invention, examples are described in the context of silhouette scores, which measure the accuracy or goodness of a clustering technique. According to some embodiments of the present invention, a cluster comprises metadata of applications and/or metadata of customers that are currently using a given environment. According to at least one embodiment, each cluster corresponds to a different potential environment.

The silhouette score is a metric with a value that ranges from −1 to 1. A silhouette score of 1 indicates that two clusters are well apart from each other and clearly distinguished. A silhouette score of 0 indicates that two clusters are indifferent, and the distance between clusters is not significant. A silhouette score of −1 indicates a mis-assignment of data points (e.g., applications) to cluster. According to some embodiments, the silhouette score is calculated as:

$$\text{silhouette score} = (b-a)/\max(a,b)$$

where a is the average intra-cluster distance or the average distance between each point within a cluster and b is the average inter-cluster distance or the average distance between all clusters.

Furthermore, a silhouette score can be calculated for an individual application and/or customer and a given environment. Thus, an application's current silhouette score (i.e., for a current environment) can be compared to a silhouette score calculated for the application in the context of another potential target environment to determine, for example, whether the potential target environment is a better fit for the application than the current environment (see FIG. 4).

Figure 3:
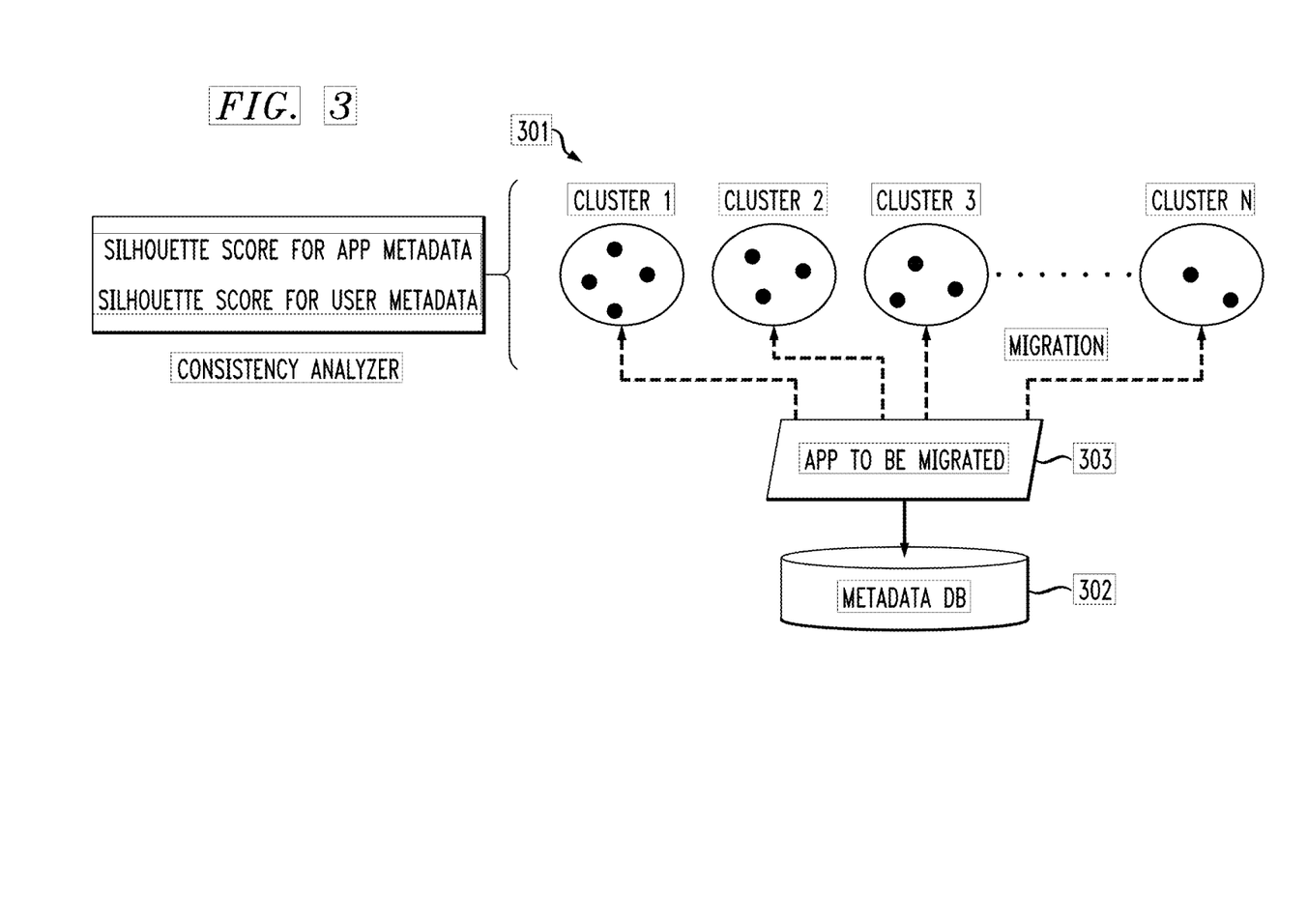
FIG. 3 is a diagram a multi-cluster environment according to an embodiment of the present invention.

FIG. 3 shows an exemplary view of a system according to some embodiments. The system includes a plurality of potential target clouds or clusters 301, and a metadata database 302 storing information about the application 303 and the target clouds 301.

Figure 4:
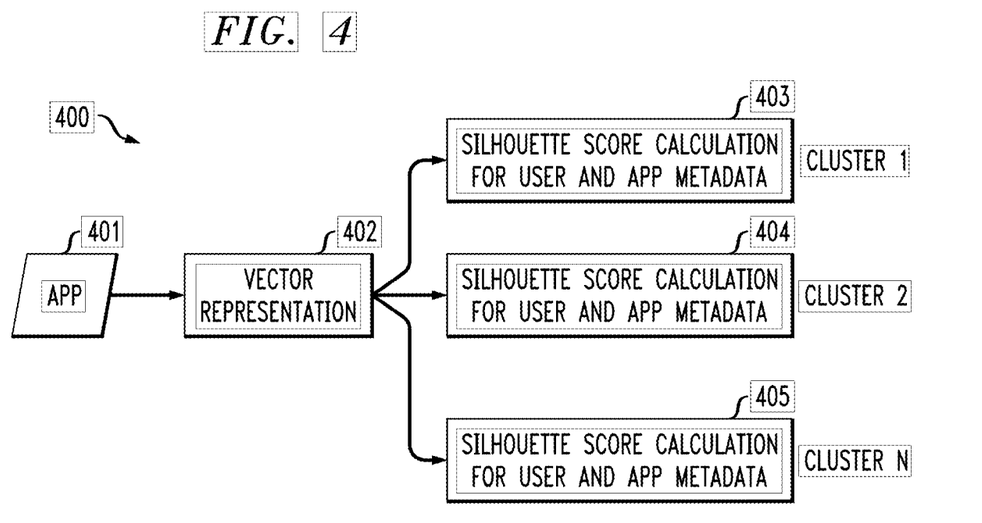
FIG. 4 is a diagram of a method of for recommending and/or selecting one or more clusters for migration of a given application according to an embodiment of the present invention.
Figure 5:
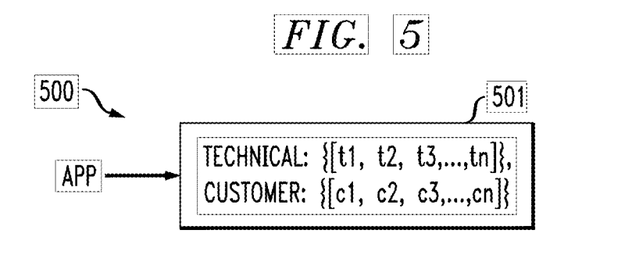
FIG. 5 depicts metadata used to represent an application according to an embodiment of the present invention.

According to some embodiments and referring to FIG. 4, a method 400 of checking the consistency of the metadata deviation includes capturing data about an application 401, where the data is composed as a vector representation 402 comprising metadata (see FIG. 5). The vector representation 402 is used to calculating a score for each of the potential targets environments (e.g., clouds) 403-405.

It should be understood that the metadata of the application can include information about technology stacks, product maturity level (such as experimental, beta, general availability (GA), etc.), customer/end user usage statistics, type of the business or industry, availability requirements, security and compliance level requirements, billing and pricing details, need for voice or AI services, etc.). According to some embodiment, the listed examples of metadata are the minimum required dimensions. It should be understood that metadata is not limited to the above data, e.g., applications can be associated with a different set of parameters (including parameters not explicitly referred to herein).

According to some embodiments, the metadata includes customer (i.e., application owner) metadata. The customer metadata can include information about the types of applications that the customer has deployed, the type of business and industry used, billing and pricing information, availability requirements, security and compliance level requirements, etc. The examples of customer metadata are not intended to be limiting, and different dimensions can be used. It should be understood that customer metadata is not limited to the above data, e.g., there are cases that have fewer parameters and additional parameters.

Unless specifically noted, references to metadata herein are intended to include the metadata of an application and the metadata of a customer.

According to some embodiments, each targeted cloud environment has its own metadata (e.g., application metadata and customer metadata hosted by the cloud environment).

According to some embodiments, the silhouette score is a measure of how similar the application (and customer) is to a group of (already) deployed applications (and the customers who deployed the applications) on the targeted cloud environment. The silhouette scores can range from −1 to +1, where a high silhouette value, near +1, indicates that the application is well matched to its metadata cluster and the targeted environment. If the application is not well matched to its metadata cluster, its silhouette value will be low, near −1. According to some embodiments, the silhouette score is compared to a threshold, and if the silhouette score is lower than the threshold, then the environment can be considered as a sub-optimal target environment. According to at least one embodiment, the system owner sets the threshold for the silhouette score (e.g., a silhouette score greater than 0). According to some embodiments, the threshold is preset, e.g., greater than +0.5. Other values for the threshold can be used.

According to one or more embodiments of the present invention and referring to FIG. 5, an application 500 is represented by a vector 501. The vector includes metadata about the application and the customer constraints 501. For a given data point d(i,j) (e.g., 501) of a type vector, d(i,j) can be calculated using Euclidean distance. It should be understood that the silhouette can be calculated with any distance metric, such as the Euclidean distance or the Manhattan distance.

According to some embodiments, the vector can include weights on one or more parameters, e.g., based on a customer preference. For example, a customer can specify weights on target environments, e.g., adding weight to a certain technology stack (e.g., REDIS or CACHE). Accordingly, the weights can guide application development (e.g., the application development team) over time (e.g., into the future). In another example, customer preferences can give priority to (1) "availability requirements" over (2) "security and compliance level requirements." In this case, a deviation in terms of (1) is given more priority than a deviation in (2). According to some embodiments, the customer is provided with a tool (e.g., a UI interface) to add weights to one or more of the dimensions of the vector, so that the weights can be considered when calculating the silhouette scores. It should be understood that existing methods of using weights (on the vector dimensions) in the preparation of clusters can be implemented according to one or more embodiments of the present invention, and that one of ordinary skill in the art would understand that weights can be assigned to clustering variables/dimensions (such as in a k-means clustering) in the process of clustering data.

According to at least one embodiment, the score is a silhouette score. The silhouette score is a measure of how similar the application and/or customer is to the deployed applications and/or the customers who deployed the application on the targeted cloud environment. The silhouette score can provide a graphical representation of how well the application has been classified. The silhouette score is a measure of how similar the application is to its own cluster (cohesion) compared to other clusters (separation). The silhouette ranges from −1 to +1, where a high value indicates that the application is well matched to its current environment (i.e., cloud) and poorly matched to other potential target clouds. According to at least one embodiment, if there are N target environments and all the target environments are have a sub-optimal score (based on the threshold) for an application or customer, the method selects the target environment having the highest silhouette score.

According to some embodiments of the present invention, a method 600 (see FIG. 6) comprises clustering the metadata about the technological requirements and customer constraints (if any) and predicting migration relevance based on a data consistency deviation.

Figure 6:
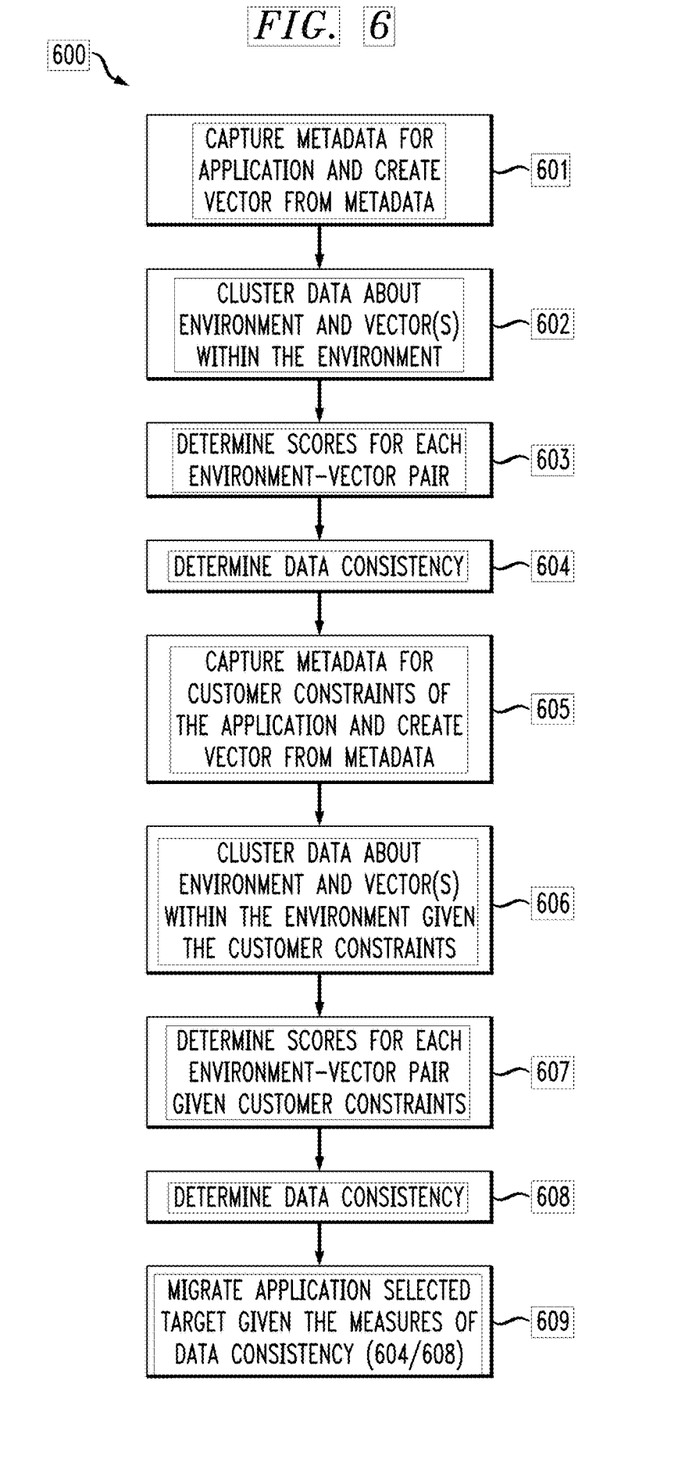
FIG. 6 is a flow diagram depicting a method for predicting migration relevance based on a data consistency deviation according to an embodiment of the present invention.

The method 600 includes capturing data about the applications in a plurality of environments 601 (e.g., an application's current environment and a plurality of potential target environments that support other applications)—recall that according to some embodiments each environment corresponds to a separate cluster.

According to some embodiments the data about a given application includes: details about technology stacks; product maturity level (such as experimental, beta, GA . . . ); end user usage statistics; type of the business or industry; availability requirements; security and compliance level requirements; billing and pricing details; need for voice or AI services; etc. It should be understood that the application metadata is not limited to the examples provided herein.

Each application is represented as a vector of the elements 601. The application vector data is clustered (e.g., by k-means clustering) according to the environments in which the applications are located 602, and an overall silhouette score is calculated for each cluster 603 indicating a similarity between the applications of the cluster/environment.

The silhouette score calculation determines the distance d for all the pairs of data points, e.g., every possible pair of vectors, in the cluster. Each data point represents metadata of an application or a customer. Since the data point representing an application is of the type "vector," the distance calculation can be determined as a standard Euclidean distance.

According to some embodiments, a pair of data points comprises a pair of vectors created for two different applications. If there are N applications in the targeted cloud environment, namely A1, A2, . . . AN, then each data point will represent metadata of A1, metadata of A2, and so on. According to at least one embodiment, an overall silhouette score for each data cluster is determined, including all the data points therein, based on distances between the data points of the cluster.

According to some embodiment, before adding a new application Am to a cluster/environment, a silhouette score is determined based on the application's metadata. If a difference between metadata of the new application Am and the cluster is too great (i.e., the silhouette score is low), then the metadata of the new application is determined to be significantly different than the existing applications of the cluster and the new application will not be migrated to the cluster.

According to some embodiments, a measure of data consistency is determined for the application metadata 603. For example, Cluster 1 and Cluster 2 may have different data consistencies for the application metadata.

The method 600 further includes capturing data about customer constraints and adding the data to the vector for the application 604. Recall that each vector includes metadata about a given application and corresponding customer constraints. The data about the customer constraints can include: the types of applications the customer deployed; the types of business and industry the customer used; billing and pricing; availability requirements; security and compliance level requirements; etc. It should be understood that the customer metadata is not limited to the examples provided herein. Such data is clustered 605, and for each cluster the overall silhouette score is calculated 606 based on the customer metadata.

According to some embodiments, a measure of data consistency is determined for the customer metadata 606. For example, Cluster 1 and Cluster 2 may have different data consistency for customer metadata.

According to at least one embodiment, the measures of data consistency are used to make a determination to migrate an application 607, for example, when measures of data consistency for the application (the data consistency scores determined based on the application metadata and the customer metadata of the application) in another environment are an improvement over the current environment. According to some embodiments, the application is migrated 608 when one or more of the measures of data consistency for another environment are a sufficient improvement over the current environment. For example, the sufficient improvement can be a 20% average improvement in the silhouette scores, where the average is calculated based on the data consistency scores determined based on the application metadata and the customer metadata of the application. In another example, the sufficient improvement can be a 35% improvement in either data consistency score. One of ordinary skill in the art would appreciate that other thresholds (i.e., improvements) can be used.

According to at least one embodiment, a method of determining a target for migration of an application (see 800, FIG. 8) to Cluster1, Cluster 2 . . . or Cluster N, includes calculating a silhouette score given the metadata of the application and metadata for the customer constraints of Cluster 1 after adding the migrated application metadata and customer metadata to the cluster 801. According to some embodiments, adding the metadata to the cluster 801 includes a temporary addition of the metadata to the cluster or a temporary copy of the cluster's data. The method 800 includes determining deviations of data consistency for the application metadata and customer constraint metadata 802. The deviations of the data consistency are determined for each cluster 802. The cluster(s) with the lowest overall deviation(s) are recommended as the targets for migration 803. According to some embodiments, the recommendation 803 is a selection of the cluster and the migration of the application to the cloud corresponding to the cluster.

According to some embodiments, at blocks 605-606 a customer can override a dimension of the metadata and re-determine the data consistency. For example, in a case where a customer has approval for elevated funding, the customer enables a deviation from the pre-set billing and pricing preferences based on an override. In this exemplary case, assume that the customer has deployed one or more applications costing $1000.00 per month, and the customer metadata includes a dimension aligned with this pricing (e.g., customer preference for applications costing not more than $1,100.00 per month); with approval for an override, the customer can remove the pricing preference from the customer metadata so that it is not considered (i.e., it will not be determined as a deviation) when finding a target environment for a new application to be deployed.

According to at least one embodiment, the determinations of data consistency at 701 can be performed in a parallel-type method (see FIG. 7), and at block 701 the measures of data consistency are determined for the current environment and the possible target environments and are compared at 702. According to some embodiments, method 700 can be performed to migrate one or more applications with different characteristics at 703.

Figure 7:
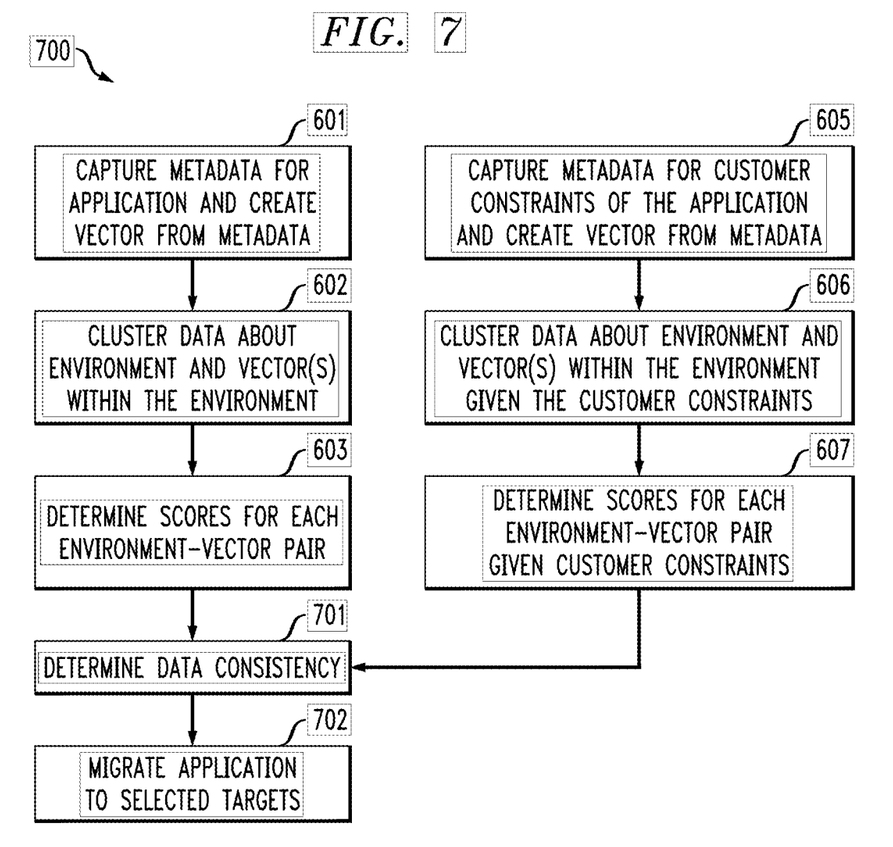
FIG. 7 is a flow diagram depicting a method for predicting migration relevance based on a data consistency deviation according to an embodiment of the present invention.

According to some embodiments of the present invention, a method for generating an automated recommendation and/or selection of a target environment via background data consistency checks 900 (see FIG. 9) includes generating periodic recommendations for applications in the environment by performing clustered data consistency checks. For example, once the method 600 (or 700) is implemented, the clustered data consistency checks can be completely automated and periodic recommendations can be generated. For example, the system can generate a recommendation to Customer1 to move their application to a provider of a type B cluster based on previous choices made by similar customers. According to some embodiments, similarity can be calculated in terms of the dimensions of the metadata, e.g., pricing and billing. Similarly, according to some embodiments, the data consistency checks can be done on all the customers that opt for such recommendations.

Figure 9:
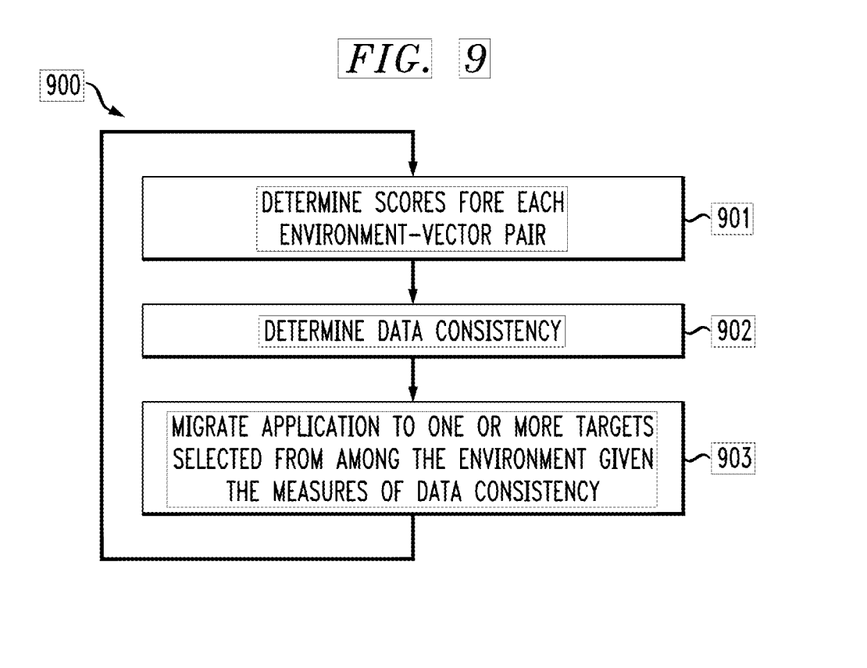
FIG. 9 is a flow diagram depicting a method for automatic migration of applications according to an embodiment of the present invention.

By way of example, the consistency check 900 is based on customer metadata deviation analysis alone (i.e., apart from application metadata). For example, the pricing and billing information of all current customers, which is available in the customer metadata cluster, is used for analysis. The customer metadata cluster includes information about all targeted environments used by the current customers. This information can be previously determined or calculated for purposes of the current analysis.

According to an exemplary case, if a current customer is using services provided by CLOUD1 and the customer's metadata cluster silhouette score (associated with the CLOUD1 environment) is increasing, this indicates that similar customers are migrating to CLOUD1 and there is no need for the current customer to migrate to a different environment; that is, the similar customers migrating to CLOUD1 are confirming the current customer's earlier selection of CLOUD1. Such an outcome can take the form of an explicit recommendation or command (to the customer's device(s), software, etc.) to remain with CLOUD1. On the other hand, if the customer's metadata cluster silhouette score is decreasing with respect to CLOUD1, and CLOUD2 and CLOUD3 have increasing silhouette scores over time (e.g., the last 30 mins, however this time period can be any interval) 901, and the customer metadata is more similar to the data points in CLOUD2 as compared to the current CLOUD1 (the similarity being determined based on silhouette score) 902, the system recommends that the customer to move to CLOUD2, and in some cases automatically triggers this migration 903.

According to some embodiments, cloud migration 903 (see also 608, 703, 803) is the automated process of relocating a customer's data, application, and workload to the selected target cloud environment. According to some embodiments, the migration 903 includes a configuration of the customer's devices to point to the new environment, migration of the customer's data to the new environment, etc. According to at least one embodiment, the migration 903 is performed automatically by the system and includes moving data from storage of a current cloud environment to a selected target cloud storage, moving the application to the selected target cloud, pointing the application to the storage, and applying network policies (optional, depending on network requirements).

Recapitulation:

According to some embodiments of the present invention, a method for migrating an application between computer environments includes representing the application as a vector comprising application metadata and customer metadata describing technological requirements, wherein a customer is an owner of the application 601/604; representing n clouds as n clusters, and the application deployed in one of the clouds as a data point in a current one of the n clusters, wherein the data point is the vector 602/606; determining a first score of the application as a component of the current one of the n clusters 603; determining a second score of the application as a potential component of another one of the at least one of the n clusters 606, wherein the first score and the second score are determined by a data consistency analysis; and migrating 608 the application to an environment corresponding to the another one of the at least one of the n clusters upon determining that the second score indicates an improvement over the first score.

Figure 8:
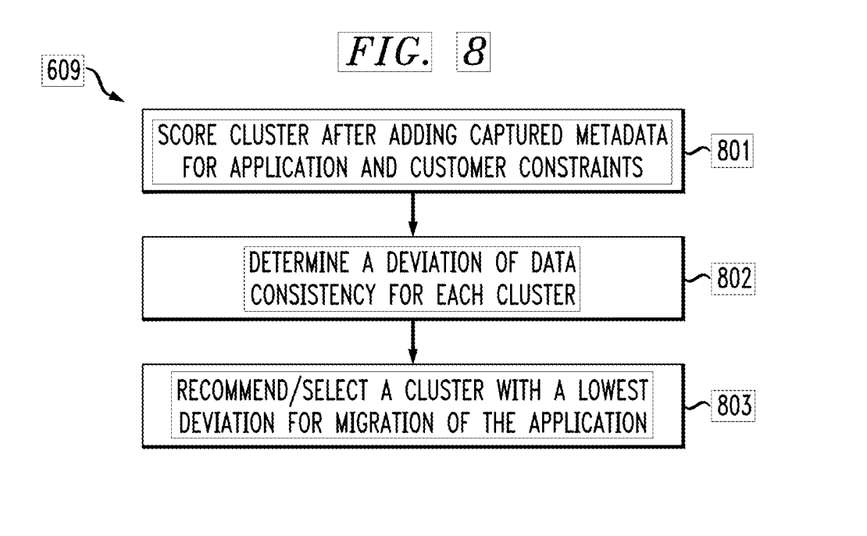
FIG. 8 is a flow diagram depicting a method for application migration according to an embodiment of the present invention.

According to some embodiments of the present invention, a method for migrating an application includes representing the application as a vector including metadata about the application and at least one customer constraint (801), scoring a deviation of data consistency for the application related to each of a plurality of clouds, including a cloud in which the application is currently deployed and a plurality of potential target clouds (802), selecting one of the potential target clouds based on the scoring, wherein the selected cloud has an improved score over the cloud in which the application is current deployed (803), and migrating the application to the selected cloud (803).

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 10:
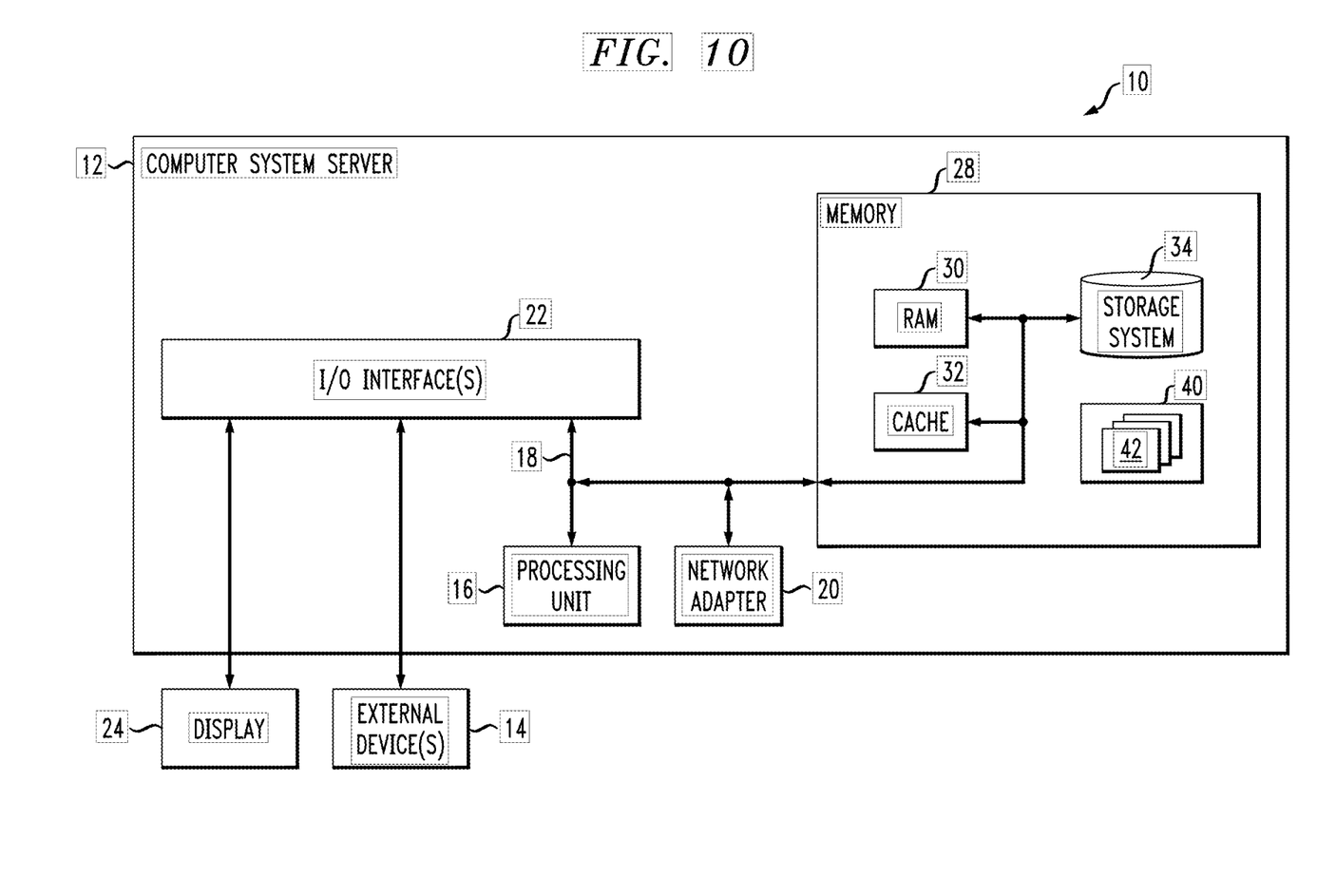
FIG. 10 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 10 depicts a computer system that may be useful in implementing one or more aspects and/or elements of the invention, also representative of a cloud computing node according to an embodiment of the present invention. Referring now to FIG. 10, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 10, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 10) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for migrating an application between computer environments comprises:
    representing the application as a vector comprising application metadata and customer metadata describing technological requirements including information about a technology stack in a deployment architecture of the application, wherein a customer is an owner of the application;
    representing n environments comprising respective pluralities of applications as n clusters of application vector data, and the application deployed in one of the n environments as a data point in a current one of the n clusters, wherein the data point is the vector;
    determining a first score of the application as a component of the current one of the n clusters;
    determining a second score of the application as a potential component of another one of the n clusters, wherein the first score and the second score are determined by a data consistency analysis and measure a cohesion of the current one of the n clusters and the another one of the n clusters, respectively; and
    migrating the application to an environment corresponding to the another one of the n clusters upon determining that the second score indicates an improvement of the measure of cohesion of the another one of the n clusters over the first score of the current one of the n clusters.

2. The method of claim 1, wherein the customer metadata includes at least one contextual requirement that affects the data consistency analysis.

3. The method of claim 1, further comprising applying a weight dimension on the vector representing the application according to a customer preference prior to determining the first score and the second score.

4. The method of claim 1, wherein the data consistency analysis applied in determining the first score comprises:
    measuring a similarity between the application and the current one of the n clusters.

5. The method of claim 1, wherein the data consistency analysis applied in determining the second score comprises:
    measuring a similarity of the application to each of then clusters, other than the current one of the n clusters.

6. The method of claim 1, wherein the migration is performed automatically.

7. The method of claim 1, wherein the migration comprises:
    moving data from storage of an environment corresponding to the current one of the n clusters to a selected target cloud storage of the environment corresponding to the another one of the n clusters;
    moving the application to the another one of the n clusters; and
    pointing the application to the selected target cloud storage.

8. The method of claim 7, further comprising updating network policies of the application.

9. A non-transitory computer readable storage medium comprising computer executable instructions which when executed by a computer cause the computer to perform a method for intelligent optimization of application migration between environments, the method comprising:
    representing the application as a vector comprising application metadata and customer metadata describing technological requirements including information about a technology stack in a deployment architecture of the application, wherein a customer is an owner of the application;
    representing n environments comprising respective pluralities of applications as n clusters of application vector data, and the application deployed in one of the n environments as a data point in a current one of the n clusters, wherein the data point is the vector;
    determining a first score of the application as a component of the current one of the n clusters;
    determining a second score of the application as a potential component of another one of the n clusters, wherein the first score and the second score are determined by a data consistency analysis and measure a cohesion of the current one of the n clusters and the another one of the n clusters, respectively; and
    migrating the application to an environment corresponding to the another one of the n clusters upon determining that the second score indicates an improvement of the measure of cohesion of the another one of the n clusters over the first score of the current one of the n clusters.

10. The computer readable storage medium of claim 9, wherein the customer metadata includes at least one contextual requirement that affects the data consistency analysis.

11. The computer readable storage medium of claim 9, further comprising applying a weight dimension on the vector representing the application according to a customer preference prior to determining the first score and the second score.

12. The computer readable storage medium of claim 9, wherein the data consistency analysis applied in determining the first score comprises:

measuring a similarity between the application and the current one of the n clusters.

13. The computer readable storage medium of claim 9, wherein the data consistency analysis applied in determining the second score comprises:

measuring a similarity of the application to each of the n clusters, other than the current one of the n clusters.

14. The computer readable storage medium of claim 9, wherein the migration is performed automatically.

15. The computer readable storage medium of claim 9, wherein the migration comprises:

moving data from storage of an environment corresponding to current one of the n clusters to a selected target cloud storage of the environment corresponding to the another one of the n clusters;

moving the application to the another one of the n clusters; and pointing the application to the selected target cloud storage.

16. The computer readable storage medium of claim 15, further comprising updating network policies of the application.

17. A method for migrating an application comprises:

representing the application as a vector including metadata about the application and at least one customer constraint;

scoring a deviation of data consistency for the application related to each of a plurality of clouds, including a cloud in which the application is currently deployed and a plurality of potential target clouds;

selecting one of the potential target clouds based on the scoring, wherein the selected cloud has an improved score over the cloud in which the application is current deployed; and migrating the application to the selected cloud.

18. The method of claim 17, wherein scoring the deviation of data consistency comprises calculating a silhouette score for each of the clouds including the application, wherein each silhouette score is calculated for a plurality of vectors corresponding to a plurality of applications in each cloud and the application.

19. The method of claim 17, wherein the migration comprises:

moving data from storage of an environment corresponding to the cloud in which the application is currently deployed to a selected target cloud storage of an environment corresponding to the selected cloud;

moving the application to the selected cloud; and pointing the application to the selected target cloud storage.

20. The method of claim 19, further comprising updating network policies of the application.

* * * * *